United States Patent [19]
Obertegger et al.

[11] Patent Number: 5,823,083
[45] Date of Patent: Oct. 20, 1998

[54] GRIPPING APPARATUS FOR REEL MATERIAL

[75] Inventors: Franz Obertegger; Mario Gandini, both of Brixen; Anton Profanter, Villnöss, all of Italy

[73] Assignee: Durst Phototechnik AG, Brixen, Italy

[21] Appl. No.: 892,837

[22] Filed: Jul. 15, 1997

Related U.S. Application Data

[63] Continuation of Ser. No. 528,726, Sep. 15, 1995, abandoned.

[30] Foreign Application Priority Data

Sep. 19, 1994 [IT] Italy ................................. BZ94A0056

[51] Int. Cl.⁶ ................................. B26D 7/02; B26D 7/14
[52] U.S. Cl. ................................. 83/175; 83/206; 83/282; 83/459; 83/649; 83/948; 242/559.2
[58] Field of Search ............................... 83/209, 282, 459, 83/175, 18, 235, 458, 466, 649, 948, 277, 206; 242/559.2, 564.4; 355/29; 399/161

[56] References Cited

U.S. PATENT DOCUMENTS

| | | | |
|---|---|---|---|
| 3,457,814 | 7/1969 | Muchnick | 83/282 X |
| 3,496,811 | 2/1970 | Flanagan et al. | 83/282 X |
| 3,701,299 | 10/1972 | Stumpf | 83/282 X |
| 3,848,500 | 11/1974 | Takahashi | 83/282 X |
| 3,937,112 | 2/1976 | Geeson | 83/209 X |
| 3,995,951 | 12/1976 | Hawkins et al. | 399/161 |
| 4,014,233 | 3/1977 | Wolfinger et al. | 83/175 X |
| 4,034,634 | 7/1977 | Arbter | 83/282 X |
| 4,077,287 | 3/1978 | Makeev et al. | 83/282 X |
| 4,488,466 | 12/1984 | Jones | 83/649 X |
| 4,523,725 | 6/1985 | Futagawa | 242/559.2 X |
| 4,688,455 | 8/1987 | Takehara | 83/175 |
| 4,864,355 | 9/1989 | Knecht et al. | 355/27 |
| 4,926,727 | 5/1990 | Maeda | 83/282 X |
| 4,932,296 | 6/1990 | Boone | 83/282 X |
| 4,938,907 | 7/1990 | Vowles et al. | 264/159 |
| 5,020,403 | 6/1991 | D'Angelo et al. | 83/282 X |
| 5,153,661 | 10/1992 | Shimizu et al. | 83/209 X |

FOREIGN PATENT DOCUMENTS

| | | |
|---|---|---|
| 082474 | 6/1983 | European Pat. Off. . |
| 300967 | 1/1989 | European Pat. Off. . |
| 379344 | 7/1990 | European Pat. Off. . |
| 60-019652 | 1/1985 | Japan . |
| 1153165 | 5/1969 | United Kingdom . |

*Primary Examiner*—Eugenia Jones
*Attorney, Agent, or Firm*—Fitch, Even, Tabin & Flannery

[57] ABSTRACT

A gripping apparatus for reel material includes a reel support, a first clamping device and a second clamping device as well as a cutting device arranged between the clamping devices. The first clamping device is spring-mounted along two non-parallel axes so that the paper web can be evenly clamped and cut transversely to the web direction without twisting and formation of undulations.

12 Claims, 2 Drawing Sheets

GRIPPING APPARATUS FOR REEL MATERIAL

This application is a continuation of application Ser. No. 08/528,726 filed Sep. 15, 19995, abandonded.

The present invention relates to a gripping apparatus for reel material, in particular for image exposing devices.

BACKGROUND OF THE INVENTION

The introduction of reel material into the exposing zone of an exposing device normally ensues by driving in the previously rectangularly cut reel material. The exact rectangular cutting of the material and the simultaneous gripping of the material is important so that no errors occur during later exposure. Additionally, the reel material should not twist during further transport or form any irregularities. In so far as the first edge of the reel material to be introduced is not exactly rectangularly cut, formation of undulations and twisting can occur both during gripping of the material as well as during later conveyance so that proper exposure can not be carried out and/or the reel material must be newly gripped.

The present invention is therefore based on the technical problem (object) to provide an apparatus for reel material with the aid of which this can be cut at a right angle to the longitudinal extension of the reel web and by means of which there is enabled a simultaneous gripping of the reel material at a right angle to its axis and without twisting and formation of undulations.

SUMMARY OF THE INVENTION

This object is solved by the features of claim 1, and in particular in that a reel support, a first and a second clamping device and a cutting device arranged between the clamping devices are provided. By means of the gripping apparatus according to the invention, the reel material supported on the reel support can roll off somewhat and be clamped in the first clamping device. Subsequently, the reel material can be gripped so that this is placed under tension between the reel on the reel support and the first clamping device without the formation of undulations. After this, the second clamping device can be actuated so that the reel material remains uniformly under tension between this and the reel itself. Following actuation of the cutting device, the evenly tensioned reel material remains clamped in the second clamping device and can be introduced from there into the image exposing device. Since the reel material is cut at this time while under a uniform tension transversely to the longitudinal extension, the uniform tension can be maintained when pulling the reel material out of the second clamping device into the image exposing device and a further transport of the reel material does not lead to twisting or the formation of undulations.

Advantageous embodiments of the invention are characterized by the dependent claims.

Thus, according to an advantageous embodiment of the invention, the first clamping device can be movably supported. When tensioning the material web between the first clamping device and the reel support, this results in the great advantage that there is an automatic compensation of tensions occurring in the material so that the material web is itself evenly placed under tension. When the first clamping device is spring-mounted, there is an even better equalisation of the pulling and pushing forces that arise in the material.

According to a further embodiment of the invention, the spring-mounting of the first clamping device is effected along two non-parallel axes. This measure again improves the even placing under tension of the material web since the material web can be tensioned in such a manner that the irregularities occurring in the web itself compensate each other along the two axes. In accordance with a further embodiment of the invention, particularly good results are obtained when one axis is transverse and the other axis parallel to the web of the reel material. In this embodiment, on the one hand, the material web can be placed under tension in the direction of the longitudinal extension of the reel material, but compensation takes place simultaneously in the direction perpendicular to this. In so far as the reel material is securely clamped by the first clamping device and subsequently placed under tension, a completely even tensioning of the material web automatically results.

This effect is further improved when the first clamping device acts on the middle of the reel material. In this case, the beginning of the reel material is, so to speak, gripped "point-like" manner so that an occurrence of irregularities is effectively avoided.

The first clamping device can be a crocodile clamp by means of which the reel material is properly securely held during tensioning but released completely after release of the crocodile clamp.

According to a further advantageous embodiment of the invention, the second clamping device acts substantially along the entire width of the reel material. As a result of this measure, after the reel material has been evenly tensioned by the first clamping device, it is fixed along the web width under this uniform tension so that the uniform tension is maintained also during later pulling of the material into the image exposing device.

In order to obtain simplified operation, a first sensor can be provided which activates the first clamping means when the reel material has reached this. In this manner, the reel material must simply be introduced into the gripping apparatus, after which the first clamping device is then actuated automatically upon arrival at the sensor. In a similar manner, a second sensor can be provided which actuates the second clamping device when the first clamping device has passed through a predetermined distance parallel to the web of the reel material. The reel material is automatically securely clamped by the second clamping device in a uniformly tensioned state because the uniform material tension adjusts itself without formation of undulations when the reel material is placed under tension against the spring force of the first clamping device.

In so far as a moveable guide plate is provided between the cutting device and the first clamping device, on the one hand, the introduction of the material web into the first clamping device is simplified and, on the other hand, following operation of the cutting device, the resulting material rest can be removed without difficulty from the apparatus.

Finally, the reel support and the second clamping device can be arranged on a revolver magazine. In this manner, the reel material can be conveyed further by means of the revolver magazine after actuation of the cutting device in order to enable introduction, for example, into an image exposing device. Simultaneously, each material reel provided on the revolver magazine can be moved into a loading position in which the introduction into the gripping apparatus is made possible.

BRIEF DESCRIPTION OF THE FIGURES

The present invention is described in the following in a purely exemplary manner on the basis of an advantageous embodiment with reference to the enclosed drawings, in which.

DETAILED DESCRIPTION OF THE INVENTION

Figure 1:
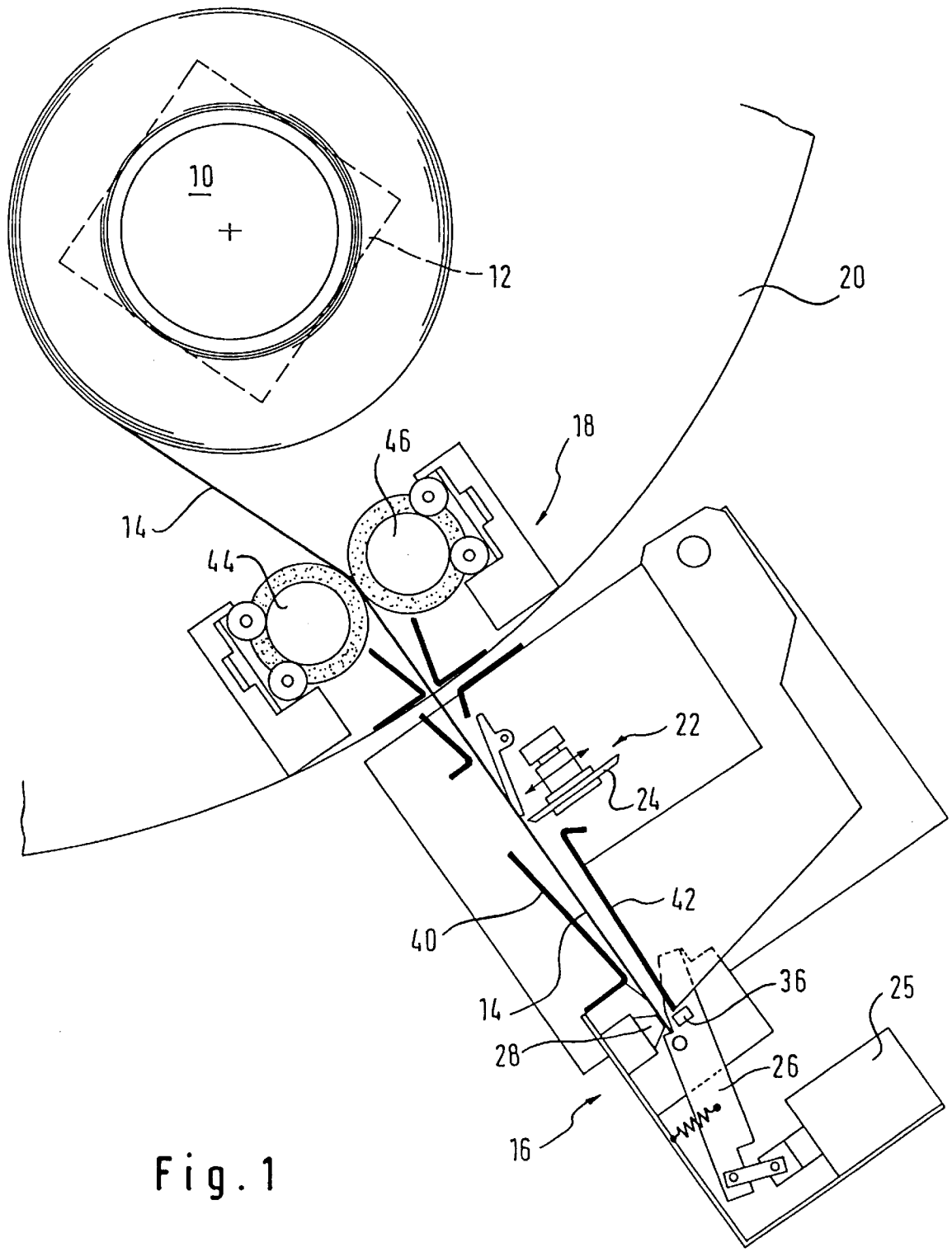
FIG. 1 shows a schematic side view of the gripping apparatus according to the invention.

The gripping apparatus for reel material illustrated in FIG. 1 has a reel support 10 for the reel core 12 of a material web 14. The reel support 10 is provided with a mechanism which permits a tensioning of the material web 14 when the end of the web is fixed. For example, the material can be photographic paper exposable to light.

A first clamping device 16 and a second clamping device 18 are also provided, the second clamping device 18 being arranged together with the reel support 10 on a rotatable revolver magazine 20. The first clamping device 16 is fixed in position.

Between the first clamping device and the second clamping device, there is a cutting device 22, the cutting knife 24 of which is provided exactly transversely to the longitudinal extension of the paper web. When the cutting knife 24 is operated, the paper web 14 is separated across its entire width.

Figure 2:
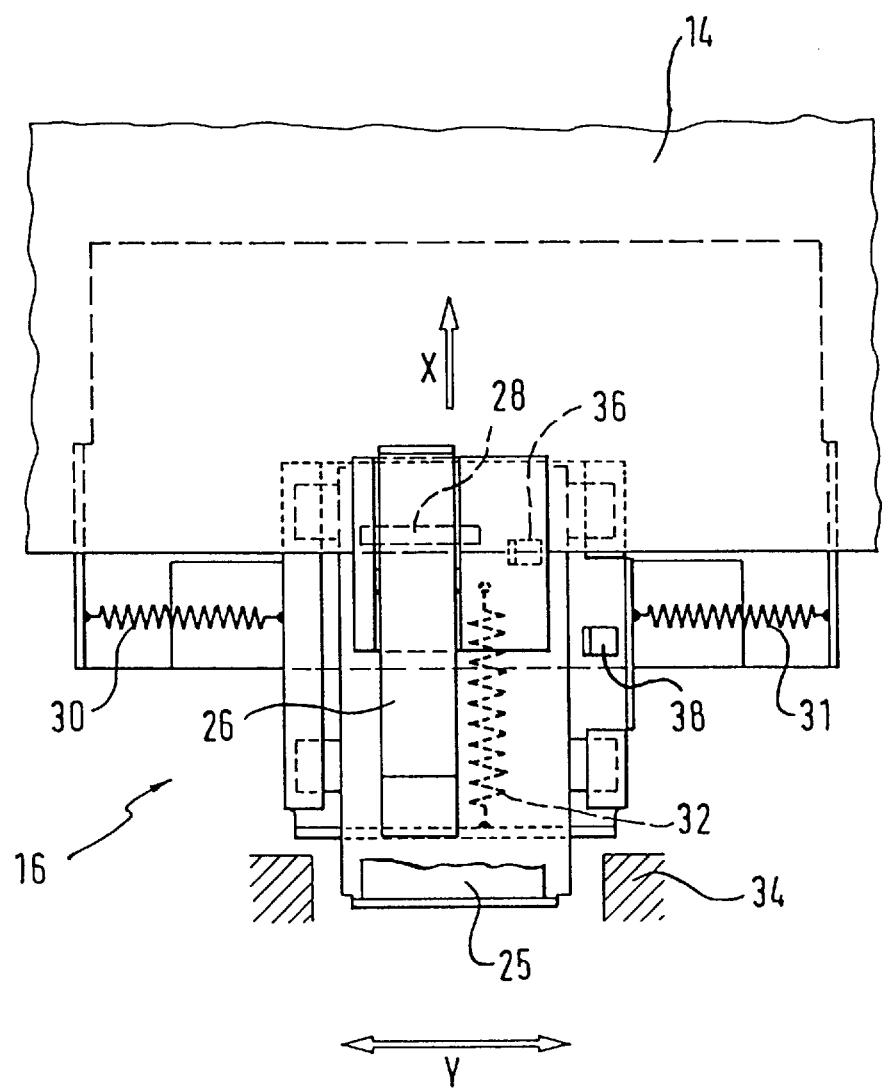
FIG. 2 shows a schematic view of a part of the gripping apparatus of FIG. 1.

As schematically shown particularly in FIG. 2, the first clamping device 16 includes a hingedly supported clamping lever in the form of a crocodile clamp 26 actuatable by means of a magnet 25 or another controllable clamping apparatus, the clamp pressing against an anvil 28. The first clamping device 16 is spring-mounted along two axes X and Y so that these are freely moveable along these axes against the spring force of springs 30, 31 and 32. In this case, the crocodile clamp 26 of the first clamping device 16 acts on the middle of the reel material 14 on account of which a "point-like" clamping area is provided when compared to the width of the material web. Additionally, there is a stop 34 against which the unit consisting of the crocodile clamp 26, the anvil 28 and the actuating magnet 25 can abut. As FIG. 2 shows, the mentioned unit is located on a cross slide which can be moved both parallel and transversely to the paper web along the axes X and Y against the force of the springs 30, 31 and 32. The free movability is in this case guaranteed by means of ball bearing linear units.

The cross slide can move in the direction of the Y axis with a stroke of respectively 25 mm from its middle position.

A first sensor 36 is provided in the area of the first clamping device 16 which actuates this first clamping device 16 when the end of the paper web 14 has reached the sensor 36. A second sensor 38 in the form of a bifurcated light barrier activates the second clamping device 18 when the first clamping device 16 has moved with a stroke of 7 mm in the X-direction, which correspond to a tensional force of 25N.

As FIG. 1 also shows, two guide plates 40, 42 are provided between the cutting device 22 and the first clamping device 16, the guide plate 42 being pivotably supported so that it can be opened in order to remove a cut rest of the paper web 14 from the apparatus.

The second clamping device 18 arranged on the revolver magazine 20 consists essentially of a first clamping roller pair 44, 46 which extends across the entire width of the paper web 14. The peripheral surface of the clamping rollers 44, 46 are rubberized, the rubberisation being formed in stages so that an even clamping results.

In the following, the mode of operation of the inventive gripping device is described, it being assumed that a reel of a paper web 14 consisting of photographic paper is mounted on the reel support 10.

At the beginning of the gripping procedure, the revolver magazine 20 must be rotated into the loading position and this can take place automatically by means of appropriate coding. Subsequently, the paper web 14 is manually or automatically introduced into the second clamping device 18, i.e. the paper web 14 is guided between the clamping rollers 44 and 46, which at this point in time do not yet exert any clamping force. The introduction can be simplified by guide plates in the second clamping device 18. After this, the paper web 14 is moved through the cutting device 22 between the guide plates 40, 42 in the direction of the first clamping device 16. As soon as the end of the paper web 14 has been moved between the anvil 28 and the crocodile clamp 26, the sensor 36 is triggered, which activates the magnet 25 so that the clamping device 16 is actuated, i.e. the crocodile clamp 26 closes and presses the paper web against the anvil 28. The paper web is then clamped in the region of the crocodile clamp 26 and can be placed under tension by rotation of the material reel on the revolver magazine 20. The tensioning can take place manually or automatically.

The paper web 14 is then tensioned until the first clamping device 16 has moved away from the stop 34 by 7 mm so that the second sensor 38 is activated. Thus, a certain precisely defined pulling tension acts on the paper web. In this state, on account of the spring-mounting of the clamping device 16, the paper web is entirely uniformly placed under tension without the formation of undulations or twisting occurring. The second sensor 38 than activates the second clamping device 18, i.e. the two clamping rollers 44 and 46 are actuated so that, on the one hand, the paper web is placed under tension between the first and second clamping devices, but also between the material reel and the second clamping device 18. By way of subsequent actuation of the cutting device 22, a cut is made extending transversely to the longitudinal extension of the paper web so that a rolling away operation at right angles to the reel web is ensured. After this, the projecting paper web is wound back into the revolver magazine and the revolver magazine 20 can then be rotated in order to bring the material web 14 into a different position in which an introduction into an image exposing device is made possible. The paper web 14 can then be pulled out of the second clamping device 18 again by clamping devices or grippers. However, as the paper web is completely uniformly gripped at this time, no twisting or formation of undulations can occur during further processing of the web in the image exposing device. When the paper web is introduced into the image exposing device, the clamping force between the clamping rollers 44 and 46 can be slightly reduced. After this, the cut off paper rest can be removed from the apparatus through the moveable guide plate 42.

We claim:

1. An apparatus for gripping an elongated material web, advanced out from a reel core and which travels in a downstream direction along a path defined by an axis X, the apparatus comprising:

a reel support for supporting the reel core of material web for rolling off the reel and for rewinding the web onto the reel core;

a first web clamp assembly on the path defined by the X axis, the first web clamp assembly for clamping the web;

a cutting device for cutting the web traveling in the path defined by the X axis, the cutting device being located upstream the first clamp assembly and downstream the reel support;

a second web clamp assembly for clamping the web, the second web clamp assembly being located between the cutting device and the reel support;

a cross slide mounting the first web clamp assembly for movement along the X axis and a Y axis;

biasing means for biasing the cross slide along the X axis and positioning the first web clamp assembly to a first position when initially clamping the web; and a second clamp assembly sensor associated with the second web clamp assembly for activating the second web clamp assembly to grip the web and hold the web for cutting, whereby the web being rewound on the reel core prior to cutting and after it has been clamped by the first web clamp assembly and the rewinding for placing the web under a predetermined tension along the X-axis.

2. An apparatus according to claim 1 the apparatus further comprising at least one spring biasing the first clamp assembly in a direction along the Y axis to center the first clamp assembly at about a middle point of the web.

3. An apparatus according to claim 1 wherein the Y axis is non-parallel to the X axis and the biasing means for biasing the cross slide along the x axis comprises at least one spring.

4. An apparatus according to claim 3 wherein the Y axis is transverse to the X axis.

5. An apparatus according to claims 1, 3 or 4 wherein the first clamp assembly is mounted in a position for acting on the web at a middle point in the web along a direction which is perpendicular to the X axis, and wherein the second clamp assembly grips the web after the web has been subjected to tension along the x-axis.

6. An apparatus according to 5 wherein the first clamp assembly includes a crocodile clamp.

7. An apparatus according to claims 1 or 3 wherein the second clamp assembly is for acting across substantially an entire width of the web along a direction which is perpendicular to the X axis.

8. An apparatus according to claim 7 wherein the second clamp assembly comprising two rollers.

9. An apparatus according to claim 1 wherein the apparatus further includes a first clamp assembly for activating sensor associated with the first clamp assembly for activating the first web clamp assembly to hold the web.

10. An apparatus according to claim 1 wherein a moveable guide plate is provided between the cutting device and the first clamp assembly.

11. An apparatus according to claims 1 or 3 wherein the first web clamp assembly further includes a clamp and a magnet which activates the clamp to hold the web.

12. An apparatus according to claims 1 or 3 wherein the reel support and the second clamp assembly are arranged on a revolver magazine.

* * * * *